United States Patent [19]

Hunter

[11] Patent Number: 5,253,901
[45] Date of Patent: Oct. 19, 1993

[54] DUCT REINFORCEMENT
[75] Inventor: A. Reese Hunter, Greensboro, N.C.
[73] Assignee: Industrial Air, Inc., Greensboro, N.C.
[21] Appl. No.: 819,405
[22] Filed: Jan. 10, 1992
[51] Int. Cl.$^5$ .............................................. F16L 9/04
[52] U.S. Cl. ..................... 285/424; 411/918; 411/437; 285/405; 138/172; 138/DIG. 4
[58] Field of Search ............ 411/918, 436, 437; 285/363, 364, 424, 405, 406, 412; 24/555, 563; 52/464, 463; 138/DIG. 4, 172

[56] References Cited

U.S. PATENT DOCUMENTS

| | | | |
|---|---|---|---|
| 1,779,346 | 10/1930 | Trachte | 411/918 |
| 1,793,127 | 2/1931 | Osius | 411/918 |
| 1,826,133 | 10/1931 | Hatch | 411/918 |
| 2,334,046 | 11/1943 | Tinnerman | 411/918 |
| 3,202,184 | 8/1965 | Godshalk | 138/172 |
| 3,387,809 | 6/1968 | Zwerling | 248/58 |
| 3,630,549 | 12/1971 | Grimm | 285/424 |
| 4,461,499 | 7/1984 | Hunter | 285/364 |
| 4,621,661 | 11/1986 | Greiner | 138/172 |
| 5,103,872 | 4/1992 | Jyh-Long | 285/364 |

FOREIGN PATENT DOCUMENTS

| | | | |
|---|---|---|---|
| 2414815 | 10/1975 | Fed. Rep. of Germany | 285/424 |
| 1346366 | 2/1974 | United Kingdom | 785/424 |

Primary Examiner—Eric K. Nicholson
Attorney, Agent, or Firm—Rhodes, Coats & Bennett

[57] ABSTRACT

A reinforced duct includes a duct section having a peripheral skin of sheet metal, a plurality of lengths of metal straps, each strap being configured to have a cross section including a V-shape portion and inwardly turned edges spaced from the apex of the V to form a gap between the edges. The straps circumscribe the duct with the apices of the V-shapes away from the peripheral skin. A plurality of screws driven outwardly through the peripheral skin into the gaps in the circumscribing straps and engage the inwardly turned edges to bind the skin to the straps so that the straps reinforce the skin to prevent excessive flexure of the skin.

17 Claims, 2 Drawing Sheets

DUCT REINFORCEMENT

BACKGROUND OF THE INVENTION

The present invention relates to improvements in reinforcing sheet metal ducts. The sheet metal which is commonly used in duct formation for handling, typically airflows, can come in various gauges or thicknesses. Good engineering practices dictate the use of various construction details during the assembly of the duct from the sheet metal material in order to provide the resulting duct with sufficient strength to withstand the forces to be exerted in its lifetime. These engineering practices are embodied in standards established by ASHRAE and SMACNA.

Among those standards are requirements that the sheet metal be reinforced in some circumstances. A common reinforcement method is called cross-breaking, in which a sheet has two intersecting creases formed in it, resulting in the appearance of an X-shaped dent.

A newer reinforcement technique is the formation of bead in the duct, in the form of a single corrugation as an outward bend in the wall of the duct extending around the periphery of the duct. These may be spaced at prescribed distances along the length of the duct. Machinery commonly available in sheet metal shops is now used for the formation of these beads at the desired locations. Where even a higher level of reinforcement is required by ASHRAE or SMACNA, it is conventional to attach angle irons to the walls of the duct. The attachment of the angle irons is a time-consuming and tedious process. First, the prescribed location of the angle iron on the length of the duct must be ascertained and a line drawn on the duct corresponding to the desired placement. Typically, the angle irons are pre-drilled with holes, but if not, the angle irons need to be drilled with holes to receive bolts. Corresponding holes must be drilled in the duct. Then, a nut and bolt are used to fasten the angle iron through the aligned holes of the angle iron and duct. Often, this is a two-man process, especially for larger cross section ducts, which are those most likely to need reinforcement. Thus, the labor expense of reinforcing ducts this way is great. Also, the contractor needs to keep angle irons in inventory, adding to his inventory expense. There is a need in the art for a less expensive way to achieve reinforcement of ducts.

SUMMARY OF THE INVENTION

The present invention fulfills this need in the art by providing an apparatus for reinforcing a duct made of a peripheral skin of sheet metal including a plurality of lengths of metal straps, each strap being configured to have a cross section including a V-shape portion and inwardly turned edges spaced from the apex of the V to form a gap between the edges. The straps together have lengths sufficient to circumscribe the duct, so that the straps can be arranged to circumscribe the duct with the apices of the V-shapes away from the peripheral skin. A plurality of fasteners are provided which can be driven outwardly through the peripheral skin into the gaps in the circumscribing straps and engage the inwardly turned edges to bind the skin to the straps so that the straps reinforce the skin to prevent excessive flexure of the skin. Preferably, the fasteners are screws that have heads with upper and lower portions, with the lower portions being convex to engage the interior of a beaded duct and the upper portions being flat to provide a minimal profile.

In one embodiment the straps have lengths greater than the lengths of the sides of the duct so that when the straps circumscribe the duct, the straps intersect at the corners. In this embodiment a fastener is used to join the intersected straps.

In another embodiment the straps have lengths about the same as the lengths of the sides of the duct and corner pieces are included having portions to engage two adjacent straps at each corner of the duct to complete the circumscription of the duct. If desired, fasteners may be used to fasten the corner pieces to the adjacent straps. More preferably, the corner pieces have two parts and additional fasteners are used to fasten the two parts of the corner pieces together.

In one embodiment the straps have a reinforcing portion in addition to the V-shaped portion. The reinforcing portion may take the form of a flange extending laterally of the V-shaped portion at the apex.

The invention also provides a reinforced duct including a duct section having a peripheral skin of sheet metal, a plurality of lengths of metal straps, each strap being configured to have a cross section including a V-shape portion and inwardly turned edges spaced from the apex of the V to form a gap between the edges. The straps circumscribe the duct with the apices of the V-shapes away from the peripheral skin. A plurality of screws are driven outwardly through the peripheral skin into the gaps in the circumscribing straps to engage the inwardly turned edges. This binds the skin to the straps so that the straps reinforce the skin to prevent excessive flexure of the skin. In one embodiment the skin of the duct section includes an outwardly-bulging, peripherally-extending bead and the straps circumscribe the duct straddling the bead.

Further, the invention provides a method of reinforcing a duct made of a peripheral skin of sheet metal. The method includes circumscribing the duct with a plurality of lengths of metal straps having a cross section including a V-shape portion and inwardly turned edges spaced from the apex of the V so that there is a gap between the edges with the apex of the V away from the skin of the duct. Then a plurality of screws are driven outwardly through the peripheral skin into the gaps in the circumscribing straps to engage the inwardly turned edges to bind the skin to the straps so that the straps reinforce the skin to prevent excessive flexure of the skin.

Generally ducts have sides meeting at corners. For this type of duct the circumscribing step may include intersecting the straps at the corners of the duct and the intersected straps are joined with a fastener.

Alternatively, the circumscribing step may include engaging the straps with corner pieces to complete the circumscription of the duct. The corner pieces may have two parts and, if so, the method preferably further includes fastening the two parts of the corner pieces together.

If the duct has an outwardly-bulging, peripherally-extending bead, the circumscribing step preferably includes circumscribing the duct so that the straps straddle the bead.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

The present invention provides an inexpensive and easily installable form of reinforcement for ducts. Preferably, the reinforcing straps used with the present invention are the same as the Snap-U-Lock coupling members manufactured and sold by Industrial Air, Inc. of Greensboro, N.C. The Snap-U-Lock product has been sold for a number of years, having been described in our prior U.S. Pat. No. 4,461,499 to Hunter et al. entitled "Transverse Joint System for Sheet Metal Ducts", the entire disclosure of which is incorporated herein by reference. Thus, the Snap-U-Lock product is already available to contractors installing ducts. The present invention reduces the complexity of an inventory required to be held by supply houses, since the same material being used for duct joining may also be used for reinforcement.

Figure 1:
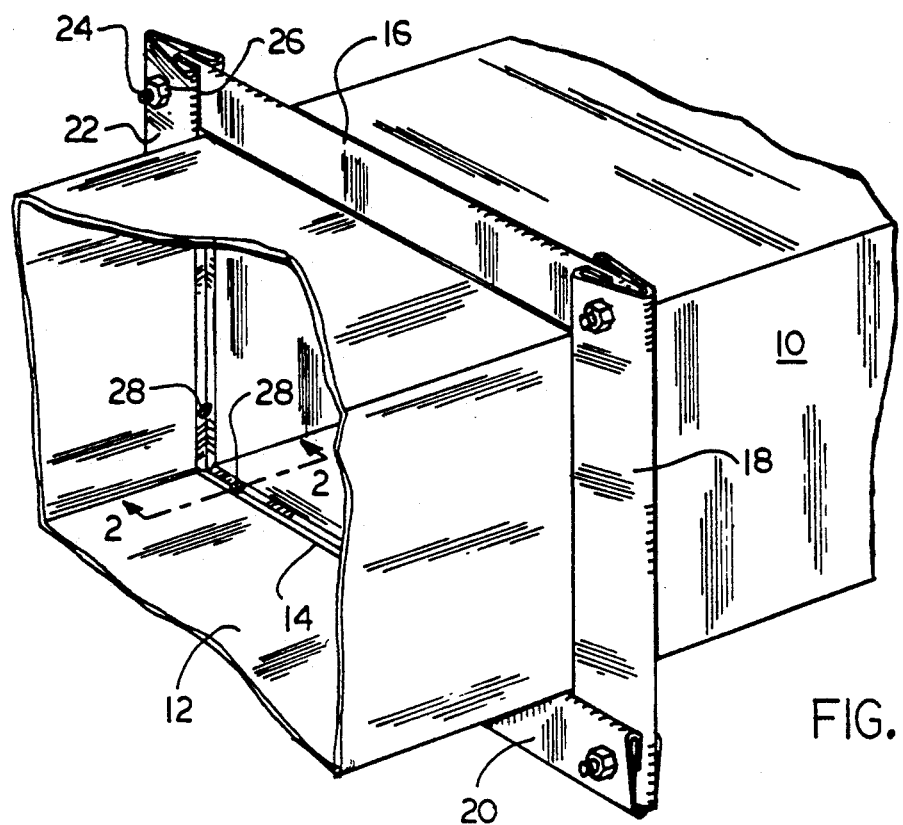
FIG. 1 is a perspective view of an embodiment of the invention as installed on a portion of a duct.

Referring now to FIG. 1, there is shown a section of duct 10 having a plurality of peripheral side walls, including wall 12. As seen in FIG. 1, the wall 12 has a bead 14 formed in it. The bead 14 is a conventional duct bead, taking the form of an outwardly projecting corrugation. The bead extends around all four sides of the duct 10, although as seen in FIG. 1, it can only be seen in two of the walls. Outward of the duct 10 and its bead, a plurality of straps 16,18,20,22 are provided straddling the beads. The straps are preferably in the form of Snap-U-Lock sections. That is, they are V-shaped with inwardly turned edges 30,32 (see FIG. 2). As seen in FIG. 1, the ends of the straps are interleaved at the corners and drilled with holes. A bolt 24 passes through the aligned holes and is held in place with a nut 26. Preferably, a lock washer is also used. As seen in FIG. 1, one end of the strap 16 has been compressed so that it fits entirely between the inwardly turned edges of the end of strap 18. Alternatively, the sides can be layered, that is, one side of strap 16 on the outside, then a side of strap 18, then the other side of strap 16, then the other side of strap 18. However, the arrangment shown in FIG. 1 is preferred since it helps to keep the straps from skewing off a position straddling the bead 14.

Figure 2:
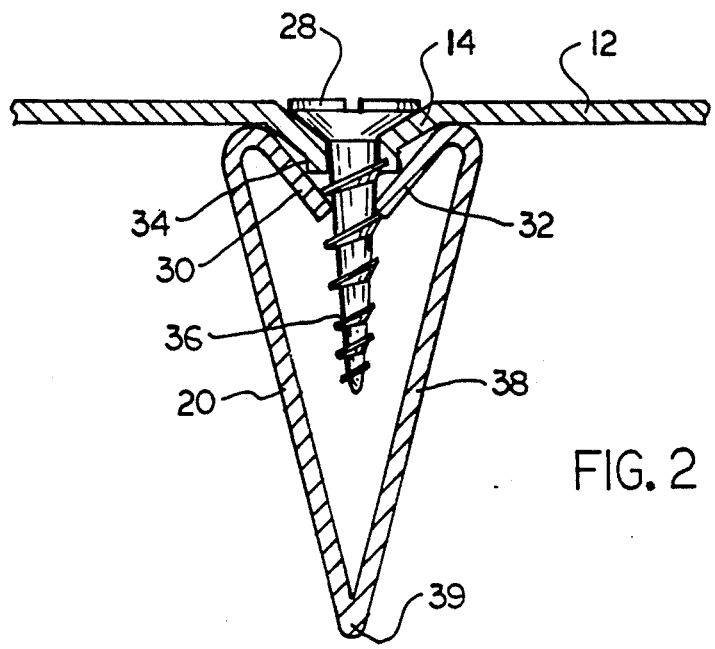
FIG. 2 is a sectional view of the embodiment of FIG. 1 taken along lines 2—2 looking in the direction of the arrows.

FIG. 2 is a sectional view of the securement of strap 20 to the wall 12 in the bottom of the duct 10. Similar sectional views of straps 16,18,22 would be the same. As can be seen, the strap 20 has a V-shaped portion 38 with inwardly turned edges 30,32 spaced away from the apex 39 of the V. The inwardly turned edges are positioned on the bead 14 in straddling relation. Then, by driving self-tapping screw 28 outwardly through the bead 14, a hole 34 is formed in the bead 14 to allow the screw 28 to pass through and the screw 28 engages the inwardly turned edges 30,32 to bind the strap 20 to the wall 12.

A convenient method of installation includes locating the four straps around the outside of the duct and joining their corners with the nuts and bolts 24,26. A single workman can usually do this without help. Then, the workman can drive screws 28 outwardly through the bead 14 into engagement with the prepositioned straps. As will be appreciated, a plurality of screws 28 will be driven out into each strap, typically spaced at about 12 inch centers.

Fastening means other than the screws 28 can be substituted such as pop rivets or nails or any other suitable fastener.

The screw 28 depicted in FIG. 2 is a presently preferred embodiment. The screw head as depicted has a lower portion the shape of which matches the configuration of the bead 14. The head has a relatively flat upper surface, so as not to result in a protrusion into the duct 10. Ducts of this sort are commonly used for conveying fiber-laden airflows and, therefore, by making the screw 28 as unobtrusive as possible, the entanglement of fibers with the screw head is minimized.

Figure 3:
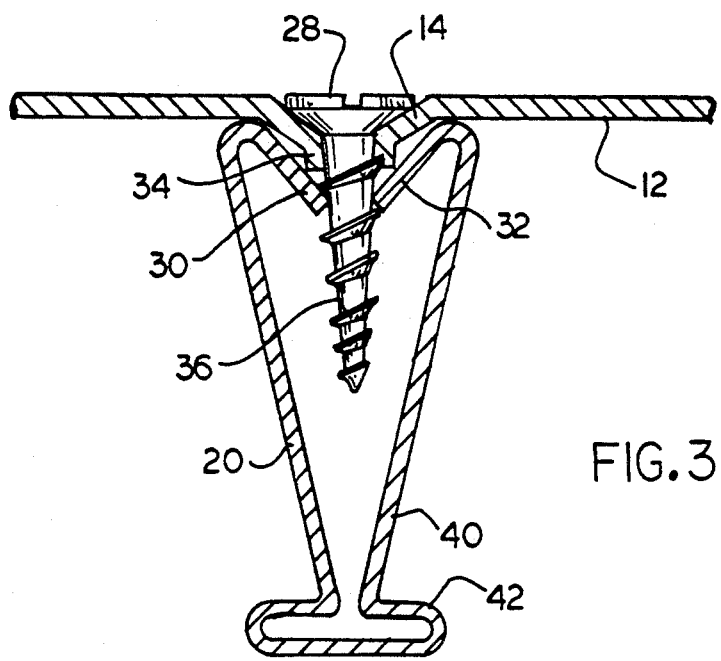
FIG. 3 is a view similar to FIG. 2 of an alternate embodiment.

An alternative embodiment of a strap 40 is shown in FIG. 3. This strap includes a flanged head 42 at the apex of the V, providing more transverse material and corrugations and therefore adding to the strength of the strap 40 and its effectiveness as a reinforcement. Other strap configurations may be substituted.

Figure 4:
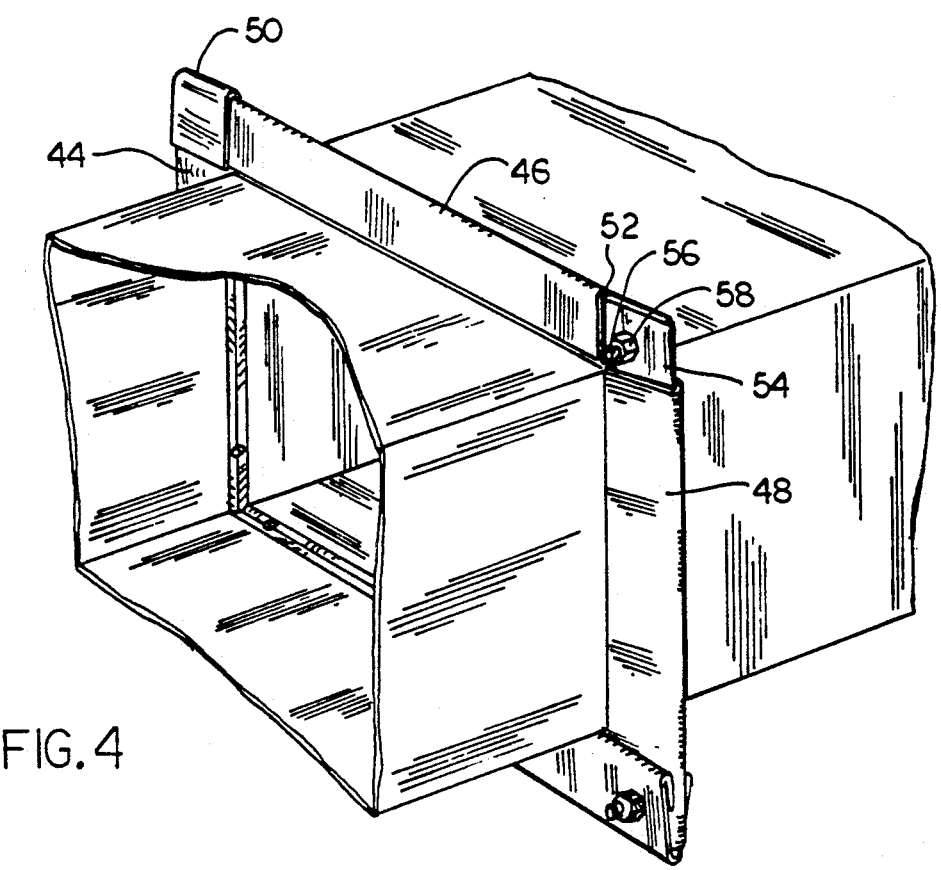
FIG. 4 is a view similar to FIG. 1 of alternate embodiments.

Further embodiments are shown in FIG. 4, mounted on a duct the same as the duct of FIG. 1. These embodiments include the use of straps 44,46,48 which are shorter than the straps of FIG. 1. The straps 44,46,48 are provided of a length about the same as the length of the sides on which they are mounted. Thus, the straps do not overlap nor extend into the common corner portion. Instead, for one corner of the duct shown in FIG. 4, a corner piece 50 having two legs is provided. Each leg of corner piece 50 is inserted into one of straps 44,46.

As an example of another embodiment, the corner piece joining straps 46,48 is made up of two elements 52, 54. Element 52 extends into strap 46 and outwardly into the intersection of the straps. Element 54 extends down into the strap 58. The elements 52,54 are provided with holes which, when installed as described, are aligned and are joined by bolt 56 and 58. Again, a lock washer may be provided on the bolt 56. Numerous other corner configurations may be substituted, particularly those as set forth in our application entitled "Corner Pieces for Improved Duct Connector" filed on even date herewith. The entire disclosure thereof is incorporated here in by reference.

The present invention provides numerous advantages over the prior art, particularly economic. First, the labor to install reinforcements according to the present invention is considerably less than for the installation of angle iron reinforcements. Typically, the present invention can be installed by one man alone, whereas with the angle iron apparatus, two men are usually required, one inside and one outside, in order to position the angle iron and secure the nut and bolt. Since only a single, self-tapping screw is driven outwardly into the prepositioned straps with the present invention, no outside man is needed. Furthermore, sheet metal suppliers and contractors need to keep less inventory on hand since the same materials used to make the coupling members can be used as reinforcing elements.

While the installation of the straps straddling a bead on a duct is preferred, the straps can be positioned on unbeaded duct or on cross-broken duct. If a high pressure or a vacuum are to be conveyed, a seal or caulking can be provided to reseal the hole 34 formed by the screws 28.

Those of ordinary skill in the art will appreciate that various modifications to the embodiments as set forth herein can be made and used without falling outside the scope of the invention.

What is claimed is:

1. An apparatus for reinforcing a duct made of a peripheral skin of sheet metal comprising
   a. a plurality of lengths of metal straps,
      i. each strap being configured to have a cross section including a V-shape portion and inwardly turned edges spaced from the apex of said V-shaped portion to form a gap between said edges and
      ii. said straps together having lengths sufficient to circumscribe the duct and arranged to circumscribe the duct with said apices of said V-shapes away from the peripheral skin, and
   b. a plurality of fasteners driven outwardly through the peripheral skin into said gaps in said circumscribing straps and engaging said inwardly turned edges to bind the skin to said straps so that said straps reinforce the skin to prevent excessive flexure of the skin.

2. An apparatus as claimed in claim 1 further comprising a duct that has sides meeting at corners, wherein said straps have lengths greater than said lengths of the sides of the duct so that when said straps circumscribe the duct said straps intersect at the corners and further comprising a fastener to join said intersected straps.

3. An apparatus as claimed in claim 1 further comprising a duct that has sides meeting at corners, wherein said straps have lengths about the same as the lengths of the sides of the duct and further comprising corner pieces having portions to engage two adjacent straps at each corner of the duct to complete the circumscription of the duct.

4. An apparatus as claimed in claim 3 wherein said corner pieces have two parts and further comprising fasteners to fasten said two parts of said corner pieces together.

5. An apparatus as claimed in claim 1 wherein said fasteners are screws that have heads with upper and lower portions, said lower portions being convex to engage the interior of a beaded duct and said upper portions being flat to provide a minimal profile.

6. An apparatus as claimed in claim 1 wherein said straps have a reinforcing portion in addition to said V-shaped portion.

7. An apparatus as claimed in claim 6 wherein said reinforcing portion includes a flange extending laterally of said V-shaped portion at said apex.

8. A reinforced duct comprising
   a. a duct section having a peripheral skin of sheet metal,
   b. a plurality of lengths of metal straps,
      i. each strap being configured to have a cross section including a V-shape portion and inwardly turned edges spaced from said apex of said V to form a gap between said edges and
      ii. said straps circumscribing said duct section with said apices of said V-shape portions away from said peripheral skin, and
   c. a plurality of screws driven outwardly through said peripheral skin into said gaps in said circumscribing straps and engaging said inwardly turned edges to bind said skin to said straps so that said straps reinforce said skin to prevent excessive flexure of said skin.

9. A reinforced duct as claimed in claim 8 wherein said skin of said duct section includes an outwardly-bulging, peripherally-extending bead and said straps circumscribe said duct straddling said bead.

10. A reinforced duct as claimed in claim 8 wherein said straps have a flange extending laterally of said V-shaped portion at said apex.

11. A method of reinforcing a duct made of a peripheral skin of sheet metal comprising
    a. circumscribing the duct with a plurality of lengths of metal straps having a cross section including a V-shape portion and inwardly turned edges spaced from the apex of the V-shaped portion so that there is a gap between the edges with the apex of the V away from the skin of the duct and
    b. driving a plurality of fasteners outwardly through the peripheral skin into the gaps in the circumscribing straps to engage the inwardly turned edges to bind the skin to the straps so that the straps reinforce the skin to prevent excessive flexure of the skin.

12. A method as claimed in claim 11 for a duct that has sides meeting at corners, wherein said circumscribing step includes intersecting the straps at the corners of the duct and further comprising joining the intersected straps with a fastener.

13. A method as claimed in claim 11 for a duct that has sides meeting at corners, wherein said circumscribing step includes engaging the straps with corner pieces to complete the circumscription of the duct.

14. A method as claimed in claim 13 further comprising fastening the corner pieces to the adjacent straps.

15. A method as claimed in claim 14 wherein said corner pieces have two parts and further comprising fastening the two parts of the corner pieces together.

16. A method as claimed in claim 11 for a duct having outwardly bulging, peripherally-extending beads wherein said circumscribing step includes circumscribing the duct so the straps straddle the bead.

17. A method of reinforcing a duct that has sides meeting at corners and made of a peripheral skin of sheet metal comprising
    a. completely circumscribing the duct with a plurality of lengths of metal straps having a cross section including a V-shape portion and inwardly turned edges spaced from the apex of the V so that there is a gap between the edges with the apex of the V away from the skin of the duct and corner pieces made of two parts,
    b. fastening the corner pieces to the adjacent straps,
    c. fastening the two parts of the corner pieces together, and
    d. driving a plurality of screws outwardly through the peripheral skin into the gaps in the circumscribing straps to engage the inwardly turned edges to bind the skin to the straps so that the straps reinforce the skin to prevent excessive flexure of the skin.

* * * * *